Feb. 5, 1929.

C. R. SHORT 1,701,393

COMPOSITE PISTON

Filed Feb. 23, 1926

Inventor

CHARLES R. SHORT

By Blackmore, Spencer & Fluit

Attorneys

Patented Feb. 5, 1929.

1,701,393

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

COMPOSITE PISTON.

Application filed February 23, 1926. Serial No. 90,159.

This invention relates to improvements in pistons for internal combustion engines, and more particularly to a composite piston having a rigid thin-walled skirt made, for example, of steel, and having a head preferably of aluminum or other metal of relatively low specific gravity and relatively good thermal conductivity.

It is among the objects of the present invention to facilitate the uniting of the head of one kind of metal, such as aluminum, to a skirt of a different metal, such as steel.

Further objects and advantages of the present invention will be apparent from the following description, reference being had to the accompanying drawings, wherein a preferred form of the present invention is clearly shown.

Figure 1:
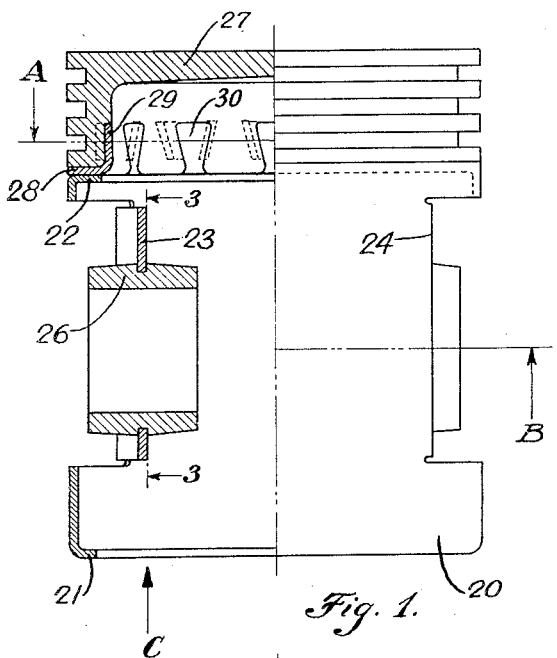
Fig. 1 is a composite view of a piston, one half being shown in section and the other half in elevation.

Referring to the drawings, 20 designates the piston skirt member which is preferably made up of sheet steel and rolled in cylindrical shape and butt-welded. The lower end of the piston is provided with a flange 21, while the opposite end has a flange 22.

Figure 3:
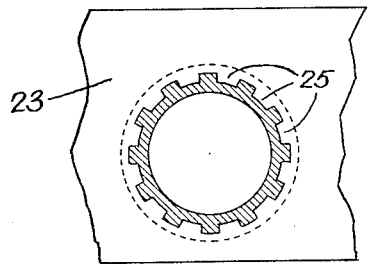
Fig. 3 is a detail view partly in section on the line 3—3 of Fig. 1.

Intermediate the ends of the piston skirt there are provided diametrically opposite flat portions 23 and 24, which are parallel and at an equal distance from the axis of the piston skirt. Each flat portion 23 and 24 has an aperture, the edges of said flat portion at the aperture being provided with a plurality of tongues 25, as shown in Fig. 3. Wrist-pin bosses 26 may be cast on each of these flat portions 23 and 24 so that the tongued edges 25 are embedded in these bosses. Bosses 26 may also be inserted within the apertures of the flat portions 23 and 24 and be welded thereto.

The piston head 27 may be made up of any suitable metal such as aluminum or white metal by the die-casting process or by any other similar method. In order to simplify the welding of the piston head, made up of aluminum, to a piston skirt constructed of steel, the head 27 is provided with a ring-shaped insert having flanges 28 and 29 and constructed of preferably the same material as the skirt.

Figure 4:
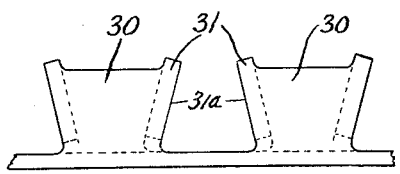
Figs. 4 and 5 are enlarged fragmentary developments of the flange portion of a ring which is adapted to be partly embedded in the piston head.
Figure 5:
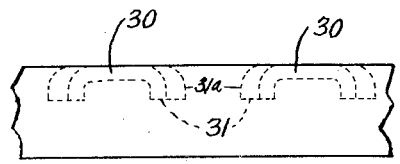

In order to facilitate the anchoring of the flange 29 in the head 27, the flange 29 comprises a plurality of key-stone shaped tongues 30 as shown in Fig. 4. The edges of the tongues 30 are flanged as shown at 31. Thus when the piston head material is cast about the flange 29 it will flow into the apertures between the various tongue members 30 and about their flanges 31 thus insuring a connection between the head 27 and the rings 28, 29 which will not loosen within the temperature range of engine operation.

After the head 27 is completed the flange 22 of the skirt is welded to the flange 28 of the insert. The flange 28 being of the same material as the piston skirt, the welding together of these two members is greatly simplified.

The angularity of the flanged edges 31 of tongue members 30 is such that even though the piston head 27 is of a greater expansibility than the ring 28, formation of these tongue members will compensate the variation of the expansibility of these two members, thus tending to hold these two members securely together under varying degrees of temperature.

Figure 2:
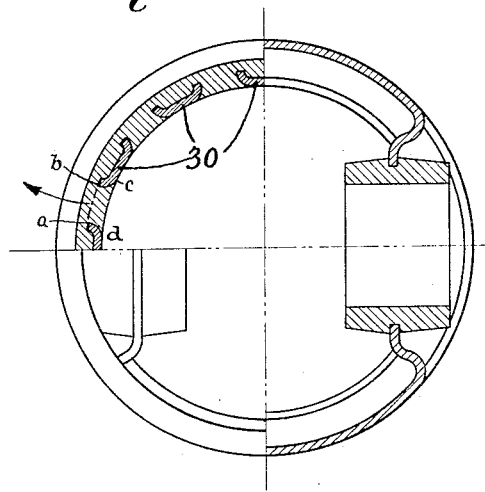
Fig. 2 is a composite view showing various transverse sections of the piston. The upper left hand quarter of the view is a transverse section taken along the line A of Fig. 1; the lower left hand quarter is a bottom view looking in the direction of the arrow C of Fig. 1; and the right half of the view is a transverse section taken along the line B of Fig. 1.

More specifically, when the piston head is heated it will tend to expand to a greater degree than the ring 28. Radial expansion of the head will tend to draw the sections of the piston head, designated by the letters $a, b, c, d$, and interposed between adjacent tongues 30 of ring 28, outwardly in a radial direction. The edges of the tongues 30 being flanged with rounded corners, as shown in the Fig. 2, this radial movement of said sections $a, b, c, d$, will tend to exert a gripping effect on the flanged edges of the tongue and thereby insure the tightness of the joint between said tongues and the piston head. At the same time the metal in sections $a, b, c, d$, will grow sidewise or circumferentially, due to expansion and consequently exert an increased pressure or gripping effect on the sides $31^a$ of the flanges 31. From this it may be seen that the joint between the head 27 and ring 28 will remain tight throughout a relatively wide range of temperatures.

While the form of embodiment of the present invention as herein disclosed, constitutes a preferred form, it is to be understood that other forms might be adopted, all coming within the scope of the claims which follow.

What is claimed is as follows:

1. A composite piston comprising a skirt member; a piston head; and a flanged ring securing the head to the skirt member, said ring having its main body portion secured to the skirt member and having a flange including a plurality of keystone shaped tongues which are embedded in the piston head.

2. A composite piston comprising a skirt member; a piston head; and a flanged ring securing the head to the skirt member, said ring having its main body portion secured to the skirt member and having a flange including a plurality of keystone shaped tongues provided with flanged edges, the entire flange of the ring being embedded in the piston head.

3. A composite piston comprising a skirt member of sheet steel rolled into cylindrical shape and butt-welded; diametrically opposite flat portions provided in the skirt intermediate its ends, said portions having apertures; wrist-pin bosses secured in said apertures; an aluminum piston head separate from said bosses; and a flanged, steel ring partially embedded in said head for securing the head to the skirt by welding process.

4. A composite piston comprising a skirt member of sheet steel rolled into cylindrical shape and butt-welded; diametrically opposite flat portions provided in the skirt intermediate its ends, said portions having apertures; wrist-pin bosses cast on the apertured flat portions of the skirt so that the edges of the flat portions are embedded in said bosses; an aluminum piston head separate from said bosses; and a flanged, steel ring partially embedded in said head for securing the head to the skirt by welding process.

5. A composite piston comprising a sheet metal ring member having flanged tongues extending therefrom and a head of lighter metal than said ring member cast thereon, the flanges on each of said tongues diverging outwardly and being embedded within the head.

6. Structure as set forth in claim 5, the said tongues lying on the inner side of said head and the flanges only being embedded therein.

7. A composite piston comprising a sheet metal skirt, a sheet metal ring secured to the end of said skirt, a head of relatively light metal cast upon said ring and out of contact with said skirt and wrist pin bosses separate from said head and carried by said skirt.

In testimony whereof I affix my signature.

CHARLES R. SHORT.